(12) United States Patent
Kopnov et al.

(10) Patent No.: US 8,194,907 B2
(45) Date of Patent: Jun. 5, 2012

(54) WIND FILTER FOR USE WITH A MICROPHONE

(75) Inventors: Nikolay A. Kopnov, Rehovot (IL);
Lorne R. Brown, Beit Shemesh (IL);
Aryeh Vered, Tel-Aviv-Jaffa (IL)

(73) Assignee: Motorola Solutions, Inc., Schaumburg, IL (US)

( * ) Notice: Subject to any disclaimer, the term of this patent is extended or adjusted under 35 U.S.C. 154(b) by 364 days.

(21) Appl. No.: 12/445,830

(22) PCT Filed: Oct. 11, 2007

(86) PCT No.: PCT/US2007/081049
§ 371 (c)(1),
(2), (4) Date: Apr. 16, 2009

(87) PCT Pub. No.: WO2008/054971
PCT Pub. Date: May 8, 2008

(65) Prior Publication Data
US 2010/0208930 A1    Aug. 19, 2010

(30) Foreign Application Priority Data
Oct. 31, 2006  (GB) .................................. 0621643.6

(51) Int. Cl.
*H04R 9/08* (2006.01)
*H04R 25/00* (2006.01)

(52) U.S. Cl. ........ 381/355; 381/359; 381/369; 381/375; 381/322

(58) Field of Classification Search .................. 381/359, 381/355, 369, 375, 322
See application file for complete search history.

(56) References Cited

U.S. PATENT DOCUMENTS

| | | | |
|---|---|---|---|
| 4,570,746 A | 2/1986 | Das | |
| 4,975,966 A * | 12/1990 | Sapiejewski | 381/189 |
| 5,282,245 A | 1/1994 | Anderson | |
| 5,452,268 A | 9/1995 | Bernstein | |
| 2005/0089180 A1 | 4/2005 | Sacki | |
| 2006/0177085 A1 | 8/2006 | Izuchi et al. | |
| 2007/0053538 A1 * | 3/2007 | Jensen | 381/359 |
| 2010/0238396 A1 * | 9/2010 | Jannard | 351/158 |

FOREIGN PATENT DOCUMENTS

| | | |
|---|---|---|
| CN | 1819708 A | 8/2006 |
| WO | 2008054971 A2 | 5/2008 |

OTHER PUBLICATIONS

PCT Search Report Dated Mar. 28, 2008.
GB Search Report Dated Nov. 29, 2006.

(Continued)

*Primary Examiner* — Long Tran
(74) *Attorney, Agent, or Firm* — Valerie M. Davis; Kenneth A. Haas

(57) ABSTRACT

A wind filter device (215) for use with a microphone (203), the wind filter device including a substrate (219) having an aperture (221) extending through the substrate, attached to a first face of the substrate a first layer (223) having a first perforated region (228) over the aperture and, attached to a second face of the substrate, a second layer (225) having a second perforated region (228) over the aperture. Also described is an arrangement of the wind filter device and a microphone, and a hand portable radio communication unit including the arrangement.

14 Claims, 5 Drawing Sheets

OTHER PUBLICATIONS

GB Examination Report dated Jul. 17, 2009 for GB Application No. GB0621643.
English Language Translation of Chinese Office Action dated Aug. 25, 2010 for CN Application No. 200780040709.
English Language Translation of Chinese Notice of Allowance dated May 31, 2011 for CN Application No. 200780040709.
English Language Translation of Korean Notice of Preliminary Rejection dated Dec. 20, 2010 for KR Application No. 10-2009-7011046.
International Preliminary Report on Patentability mailed on May 14, 2009 for International Application No. PCT/US2007/081049.

* cited by examiner

WIND FILTER FOR USE WITH A MICROPHONE

CROSS REFERENCE TO RELATED APPLICATIONS

This application is a National Stage filing under 35 USC §371 of co-pending Patent Cooperation Treaty international application having Serial No. PCT/US2007/81049 (the "PCT international application") filed on Oct. 11, 2007. This application claims priority to the PCT international application and to prior Great Britain (GB) national application having Serial No. 0621643.6 filed on Oct. 31, 2006, the priority of which was also claimed in the PCT international application. Both the PCT international application and the GB national application are assigned to Motorola, Inc.

FIELD OF THE INVENTION

The present invention relates to a wind filter for use with a microphone, particularly a microphone of a hand portable radio communication unit.

BACKGROUND OF THE INVENTION

When a microphone is being used outdoors in a windy environment the wind can cause air turbulence in the vicinity of the microphone. The turbulence is produced by pulsing of the air flow as it meets obstacles such as a housing of the microphone. For example, such a housing may comprise a casing of a radio communication unit incorporating the microphone. The turbulence is a source of localised changes in air pressure and air flow speed. The turbulence is a source of noise in the microphone which has a frequency spectrum in the audio frequency range. The noise degrades a speech signal being picked up at the microphone. When the wind is very strong the noise it produces may be of such a high level that the speech signal becomes unintelligible.

A known method of reducing wind produced noise experienced by a microphone involves providing a protective covering over the microphone using an open cell foam material. The problem with employing this method is that a relatively large amount of the foam material is normally required to give a suitable reduction of wind noise. Unfortunately, the known method is not suitable for use in protecting a microphone incorporated in a hand portable radio communication unit such as a portable radio, mobile telephone or the like. In such units components such as the microphone have to be suitably small and compact and use of a large amount of protective material is not appropriate.

SUMMARY OF THE INVENTION

According to the present invention in a first aspect there is provided a filter device as defined in claim 1 of the accompanying claims.

According to the present invention in a second aspect there is provided an arrangement of a filter device and a microphone, the arrangement being as defined in claim 14 of the accompanying claims.

According to the present invention in a third aspect there is provided a hand portable radio communication unit as defined in claim 15 of the accompanying claims.

Further features of the invention are as defined in the accompanying dependent claims and are disclosed in the embodiments of the invention to be described.

Embodiments of the present invention will now be described by way of example with reference to the accompanying drawings, in which:

BRIEF DESCRIPTION OF THE DRAWINGS

The accompanying drawings, in which like reference numerals refer to identical or functionally similar elements throughout the separate views and which together with the detailed description below are incorporated in and form part of the patent specification, serve to further illustrate various embodiments and to explain various principles and advantages of the present invention.

Figure 1:
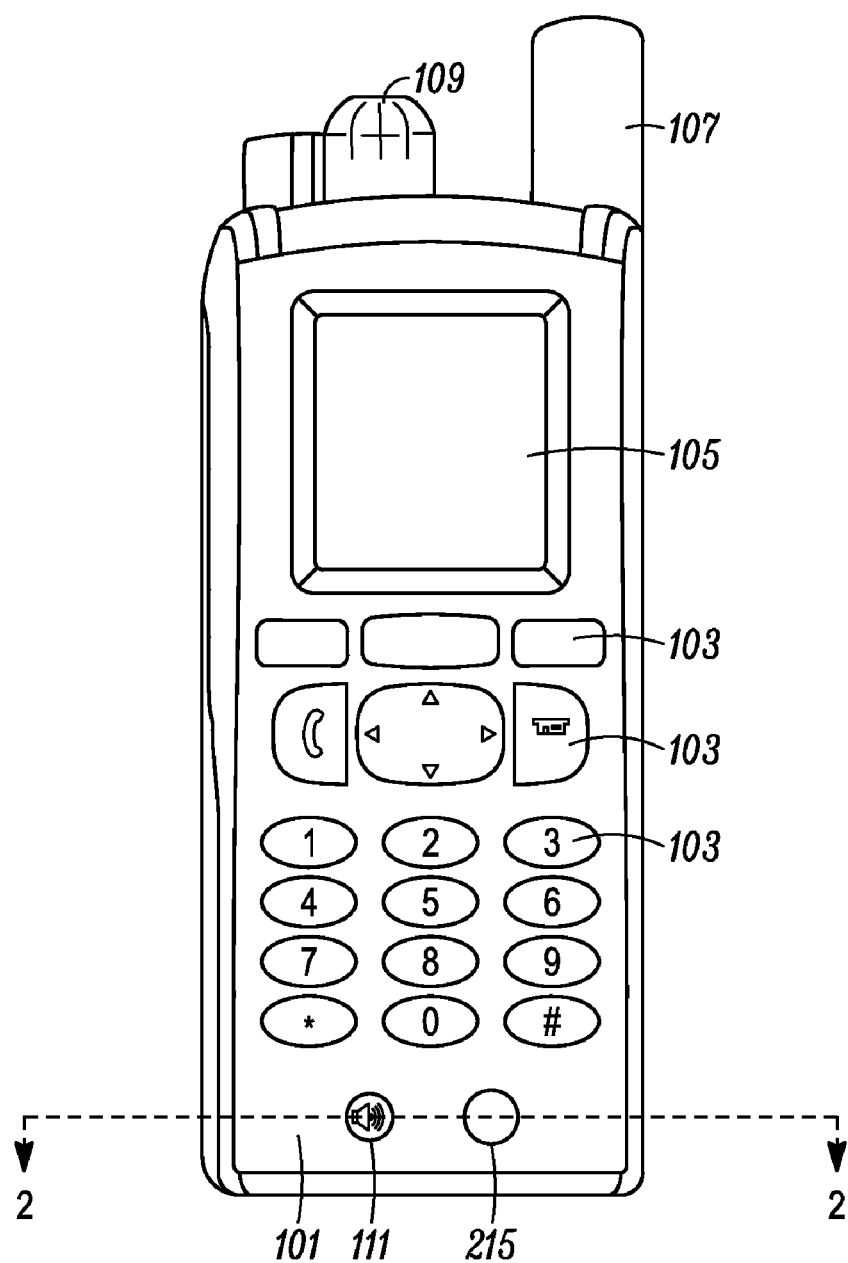
FIG. 1 is a front view of a hand portable radio communication unit incorporating a wind filter device embodying the invention.

Skilled artisans will appreciate that elements in the accompanying drawings are illustrated for simplicity and clarity and have not necessarily been drawn to scale. For example, the dimensions of some of the elements in the drawings may be exaggerated relative to other elements to help to improve understanding of embodiments of the present invention.

DESCRIPTION OF EMBODIMENTS OF THE INVENTION

Before describing in detail embodiments that are in accordance with the present invention, it should be observed that the embodiments reside primarily in combinations of method steps and apparatus components related to a method and apparatus for wind filtering in connection with a microphone. Accordingly, the apparatus components in some cases have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In accordance with embodiments of the invention to be described, a wind filter device is provided for use with a microphone, for example a microphone of a portable radio communication unit. The wind filter device includes a substrate having an aperture extending through the substrate, attached to a first face of the substrate a first layer having a first perforated region over the aperture and, attached to a second face of the substrate, a second layer having a second perforated region over the aperture. The wind filter device may include a spacer ring mounted adjacent to the substrate, e.g. against the first layer, adapted to provide an enclosed space between the first layer and a microphone.

An operational arrangement embodying the invention includes the wind filter device and a microphone fitted behind the wind filter device. The arrangement is suitable for incorporating in a hand portable radio communication unit. In a further embodiment of the invention the arrangement is included in such a unit. Such a unit may include a casing having a hole in which the filter device is fitted to plug the hole with the microphone fitted behind the filter device in the casing of the unit. Where the filter device is fitted in the casing in this way, the filter device may conveniently have a front (outer) surface which is substantially flush with (has a uniform profile with) a front surface of the casing.

Generally speaking, pursuant to the various embodiments, a wind filter device is provided which is compact and suitable for use with a microphone of a hand portable communication unit. Those skilled in the art will realize that the above recognized advantages and other advantages described herein are merely exemplary and are not meant to be a complete rendering of all of the advantages of the various embodiments of the present invention.

FIG. 1 is a front view of an illustrative portable radio communication unit 100 incorporating an illustrative wind filter device 215 embodying the invention. Those skilled in the art, however, will recognize and appreciate that the specifics of this illustrative embodiment are not specifics of the invention itself and that the teachings set forth herein are applicable in a variety of alternative settings, e.g. other communication devices. The unit 100 includes a casing 101 having fitted in its front face conventional components including control buttons 103, a speaker on/off button 111 and a display 105. The unit 100 also includes at an upper end of the casing 101 an antenna unit 107 and a volume control knob 109.

Figure 2:
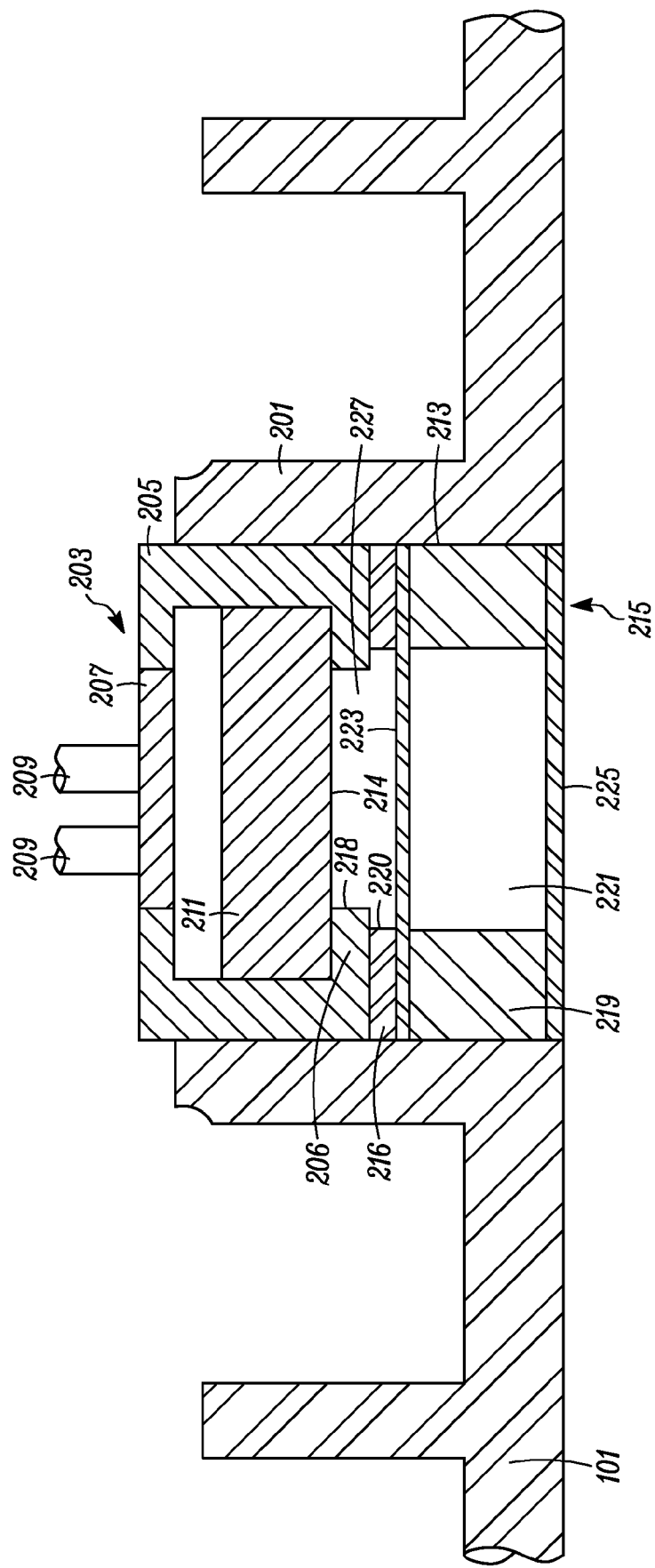
FIG. 2 is a transverse cross-section on a plane defined by the line 2-2 in FIG. 1 of an arrangement embodying the invention of a microphone and a wind filter device incorporated in the radio communication unit of FIG. 1.

The wind filter device 215 is in the form of a plug fitted in a hole provided in the casing 101. The filter device 215 is fitted in front of an internal microphone 203 (FIG. 2). The filter device 215 is shown in FIG. 1 to be located near a lower end of a front face of the casing 101, although it could be located in another suitable part of the casing 101 with the microphone 203 located behind the filter device 215.

FIG. 2 is a transverse cross-section through the casing 101 of the unit 100 on a plane (perpendicular to the plane of FIG. 1) defined by the line 2-2 in FIG. 1. FIG. 2 shows an arrangement of the microphone 203 and the wind filter device 215 incorporated in the radio communication unit 100.

As shown in FIG. 2, the casing 101 of the unit 100 has a number of internal features including an annular holder 201. The microphone 203 is housed in a cylindrical space bounded by the holder 201. The microphone 203 may have a known construction which includes a case 205, a contact pad 207, to which external conductors 209 are attached, and an active part 211 comprising a known microphone capsule which converts received sound waves into electrical signals. The active part 211 has, facing the filter device 215, an exposed face 214 which is substantially planar. The exposed face 214 has a diameter and a surface area which are defined by an annular portion 206 of the case 205. The annular portion 206 has an inner curved edge 218. A spacer ring 216 inside the cylindrical space provided by the holder 201 is fitted against the annular portion 206 of the case 205. The inner curved edge 218 of the annular portion 206 may have a diameter which is less than the diameter of an inner curved edge 220 of the spacer ring 216.

The holder 201 is open at its outer end thereby providing a hole 213 through the casing 101. The filter device 215 is fitted inside the cylindrical space provided by the holder 201 and is seated on the spacer ring 216. The filter device 215 thereby plugs the hole 213 through the casing 101.

The filter device 215 comprises an annular substrate 219 having an axial aperture 221 which may have a diameter which is substantially the same as the diameter of the inner curved edge 220 of the spacer ring 216. A first layer 223 is bonded to the inner surface (i.e. a surface facing the microphone 203) of the substrate 219 and covers the aperture 221. Similarly, a second layer 225 is bonded to the outer surface of the substrate 219 and also covers the aperture 221. Thus, the aperture 221 forms a cylindrically shaped chamber or enclosure between the layers 223 and 225. Another cylindrically shaped chamber 227, having circular side walls formed by the inner curved edge 220 of the spacer ring 216 and the inner curved edge 218 of the annular portion 206, is formed between the first layer 223 and the exposed face 214 of the active part 211 of the microphone 203. Since the inner curved edges 218 and 220 have different diameters in the arrangement shown in FIG. 2, the circular side walls of the chamber 227 include a step between the annular portion 206 and the spacer ring 216.

It is to be noted that by fitting of the filter device 215 in the hole 213 through the casing 101 in the manner shown in FIG. 2, the outer surface of the filter device 215 can conveniently be substantially flush with the outer surface of the casing 101, in other words with the surface of the front face of the casing 101 shown in FIG. 1.

Figure 3:
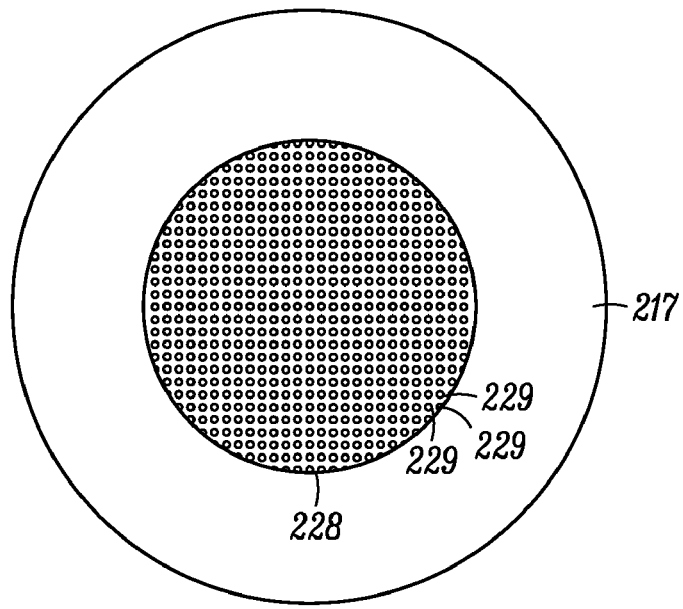
FIG. 3 is an enlarged front view of the filter device of the arrangement of FIG. 2.

FIG. 3 is an enlarged front view showing more detail of the second layer 225 of the filter device 215. The first layer 223 of the filter device 215 may have the same construction as the second layer 225. An inner circular region 228 of the layer 225 has a diameter which is substantially the same as or less than the diameter of the aperture 221 of the substrate 219 (FIG. 2). The inner circular region 228 is perforated with a matrix of fine holes 229. Examples of a suitable diameter of the holes 229 and of a suitable number of holes in the matrix are discussed later. An outer annular region 217 is formed around the inner circular region 228. The outer region 217 does not need to be perforated. The first layer 223 and the second layer 225 are bonded to opposite outer faces of the substrate 219 so that the inner perforated circular region 228 of each of the layers 223 and 225 is over the aperture 221. The inner perforated circular region 228 of each of the layers 223 and 225 may have a diameter which is substantially the same as the diameter of the aperture 221 and the inner perforated circular region 228 of each of the layers 223 may substantially cover the aperture 221. Bonding of the layers 223 and 225 may be provided by a suitable bonding agent, e.g. a resinous adhesive.

The filter device 215 when fitted in the communication unit 100 together with the microphone 203 operates as follows. When a user of the communication unit 101 is speaking in front of the unit 101, sound waves from the user pass through the filter device 215 and reach the active part 211 of the microphone 203 where they are converted into an electrical signal which is delivered via the conductors 209 to a radio operational unit (not shown) inside the unit 100. The sound waves from the user pass through the holes 229 of the layers 225 and 223 as well as through the aperture 221 and the chamber 227. The filter device 215 is thereby transparent to the speech sound waves. If the user is using the unit 100 in a windy environment, the wind is filtered by the filter device 215. Noise normally produced by the wind is attenuated to an acceptably low level by the filter device 215.

Operation of the filter device 215 may be further explained as follows. The air flow speed of wind can be much higher than the speed of air movement caused by speech. The dynamic resistance to air flow caused by wind within the holes 229 in each of the first layer 225 and the second layer 223 of the filter device 215 is a non-linear function of the air flow speed. This dynamic resistance is proportional to air flow speed to the power of n, where n is a number which can be greater than 2. On the other hand, the dynamic resistance within the holes 229 of the filter device 215 of the lower speed movement of air due to speech is roughly linearly proportional to the air movement speed. So the wind filter device 215 acts as an air speed filter: it has a high dynamic resistance to the high speed air flow caused by wind and a low air flow resistance to the low speed movement of air caused by speech.

Consider that there is a movement of air caused by speech in the presence of wind in the space in front of the casing 101 and that the air movement is toward the microphone 203 and falls on the filter device 215. At the holes 229 of the second layer 225 the air movement receives a resistance which causes wind rather than speech to be filtered in the manner described above. The resistance to the air movement causes the air pressure to rise. As the moving air passes through the holes 229 of the second layer 225 into the space of the aperture 221, the volume expands causing the air pressure to fall. When the moving air reaches the first layer 223, there is a further resistance causing any remaining wind rather than speech to be filtered in the manner described above. The resistance also causes the pressure of the air to rise once more. As the moving air passes through the holes 229 of the first layer 223 into the space of the chamber 227, the air pressure falls once more as the volume expands once more. Thus, the moving air which reaches the active part 211 of the microphone 203 thereby has a suitably low (approximately atmospheric) pressure and is due essentially to speech rather than wind.

Figure 4:
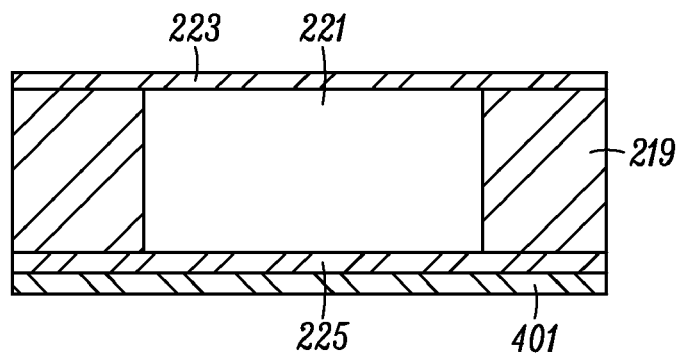
FIG. 4 is a transverse cross-section (taken in the same plane as FIG. 2) of a filter device which is a modification of the filter device shown in FIG. 2.

FIG. 4 is a cross sectional side view (taken in the same plane as FIG. 2) of an illustrative filter device 415 embodying the invention. The filter device 415 is a modification of the device 215. In the filter device 415 the substrate 219 has, bonded to its outer face so as to cover the second layer 225, a further layer 401 which is made of a woven mesh material providing fine holes between its woven strands. The fine holes of the mesh material of the further layer 401 serve to provide an additional resistance to the movement of air which provides an additional filtering of the wind before it reaches the second layer 225. Thus, the mesh material of the further layer 401 may give a further improvement to the attenuation of wind by the filter device 415. An illustration of the further improvement obtained is illustrated later with reference to FIG. 5.

The filter device 215 or 415 may be used in conjunction with microphones having various sizes.

Suitable sizes and properties of components of the filter device 215 and its arrangement with the microphone 203 will now be described. Such sizes and properties should be regarded as illustrative rather than limiting. In hand portable radio communication units the microphone is typically small and compact. A typical outer diameter of the microphone 203 is 8 mm and a typical diameter of the exposed face 214 of the active part 211 of the microphone 203 is about 4 mm. So the perforated region 228 of each of the layers 225 and 223 of the filter device 215 for use in conjunction with such a microphone may have a diameter of about 4 mm, and the aperture 221 may also have a diameter of about 4 mm.

The perforated region 228 of each of the layers 225 and 223 over the aperture 221 may have a size and surface area which match the size and surface area of the exposed face 214 of the active part 211 of the microphone 203. However, a perfect match is not required for the filter device 215 or 415 to give a satisfactory wind filtering effect. For example, the diameter d of the perforated region 228 and the diameter $d_1$ of the exposed face 214 of the active part 211 of the microphone 203 may be related by a ratio $d/d_1$ which is in the range of from about 0.7 to about 1.3.

The substrate 219 may be made of an insulating material which has a suitable mechanical strength and rigidity and can be suitably machined to provide the aperture 221. The substrate 219 may for example be made of a plastics or resin based material. A widely available material which is convenient for forming the substrate 219 is the standard glass fibre reinforced resin material known by the industry standard name FR4. This material is normally used for making printed circuit boards. The thickness t of the substrate 219 may be related to the diameter d of the aperture 221 by a ratio t/d, where the ratio t/d is in the range from about 0.1 to about 1.0, e.g. from about 0.4 to about 0.6. For example, where d is about 4 mm, the thickness t of the substrate 219 may be about 2 mm.

The layers 223 and 225 may be made of a water repellent, insulating material which has suitable mechanical strength and rigidity and can be suitably machined to provide the holes 229. The layers 223 and 225 may for example be made of a plastics or resin based material, which may for example be the material FR4 referred to above. The thickness of each of the layers 223 and 225 may be in the range of from about 0.025t to about 0.075t, where t is the thickness of the substrate 219. Typically, the thickness of each of the layers 223 and 225 is about 0.05t, e.g. about 0.1 mm where the thickness t of the substrate 219 is about 2 mm.

The holes 229 in the perforated regions 228 of each of the layers 223 and 225 may have a diameter which is in the range of from about $0.005d_2$ to about $0.08d_2$, where $d_2$ is the diameter of the perforated circular region 228 (which may be roughly the same as the diameter d of the aperture 221). Typically, the diameter of the holes 229 may be from about $0.01d_2$ to about $0.03d_2$, e.g. about 0.05 mm to about 0.1 mm where the diameter $d_2$ is about 4 mm.

The holes 229 may be formed in each of the layers 223 and 225 by a suitable known hole cutting procedure. For example, the holes 229 may be formed by cutting by repeated use of a laser beam in a known operation.

The number of holes 229 that may be incorporated in the inner perforated circular region 228 of the layers 223 and 225 may vary over a wide range of values, e.g. from about 100 or less to about 400 or more. For example, where the holes 229 have a diameter of about 0.1 mm, it has been found that a number of holes between about 100 and about 200, e.g. about 150, gives satisfactory results; and where the holes have a diameter of about 0.05 mm, it has been found that a number of holes between about 250 and about 400, e.g. about 320, gives satisfactory results.

A suitable depth of the chamber 227 measured between the first layer 223 and the active part 211 of microphone 203 may be selected by adjusting the thickness of the spacer ring 216 employed. The depth of the chamber 227 may for example be from about 0.5t to about 1.5t, where t is the thickness of the substrate 219.

Where the further layer 401 is employed in the filter device 415, the further layer 401 may have air holes or gaps between woven strands having a diameter of between about 0.01 mm and about 0.05 mm. The further layer 401 may for example be provided by a commercially available fine woven material, such as the material commercially available under the trade name TETEX MONO PES-25/PRD from Swiss Silk Bolding Cloth Manufacturing Co. Ltd., Zurich, Switzerland.

Figure 5:
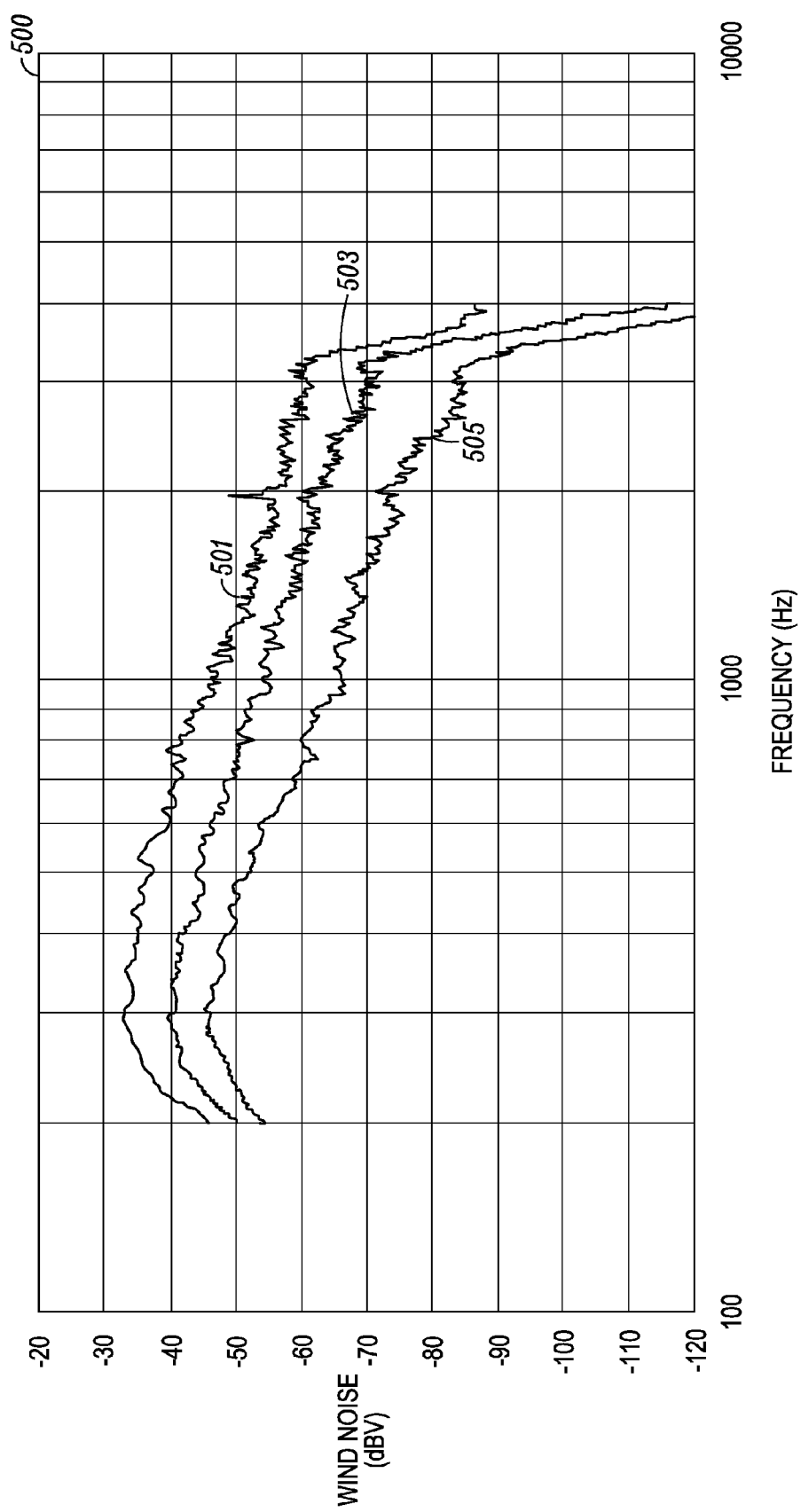
FIG. 5 is a graph of wind noise plotted against frequency illustrating performance of the filter devices of FIG. 2 and FIG. 4.

A radio (communication unit) having filter devices 215 and 415 alternatively fitted was investigated to illustrate how effective the filter devices 215 and 415 are. In the investigation, the diameter of the exposed face 214 of the active part 211 of the microphone 203 and the diameter of the inner perforated circular region 228 of the layers 223 and 225 were all about 4.2 mm. The substrate 219 had a thickness of about 2.0 mm. The layers 223 and 225 had a thickness of about 0.1 mm and each of the layers 223 and 225 had about one hundred and fifty five holes 229 having a diameter of about 0.1 mm. A wind having a speed of about six meters per second was directed at the radio and the noise performance of the radio was measured (a) without a filter device; (b) with the filter device 215 fitted; and (c) with the filter device 415 fitted. In each case the noise performance was measured by putting the radio into vocoder loopback mode thereby generating an internal signal simulating detected speech. The wind noise performance of the radio was estimated by taking a signal from an earpiece terminal of the radio having a 32 ohm resistive load and measuring the signal directly by a signal analyser. The results obtained are shown in FIG. 5 which is a graph 500 of wind noise (in dBV) plotted against audio frequency (in Hertz) relative to a fixed convenient voltage level of one volt applied across the radio earpiece terminal output. A curve 501 shown in FIG. 5 was obtained for the radio without a filter device. A curve 503 was obtained for the radio with the filter 215 fitted. A curve 505 was obtained for the radio with the filter 415 fitted. The wind noise performance is significantly improved by use of the filter device 215 as seen by the curve 503 being significantly below the curve 501. The noise performance is further improved by use of the filter device 415 as seen by the curve 505 being significantly below the curve 503. Generally, the use of the filter device 215 reduces the wind noise by about 12 dB (using weighted root mean square voltage values). Use of the filter device 415 further reduces the wind noise by about 6 dB.

The sensitivity (frequency response) of the microphone of the radio (similar to microphone 203 of the unit 100 of FIG. 1) was also investigated without any filter device fitted and with the filter devices 215 and 415 alternatively fitted. The results showed no significant change in the sensitivity of the microphone in each case.

Figure 6:
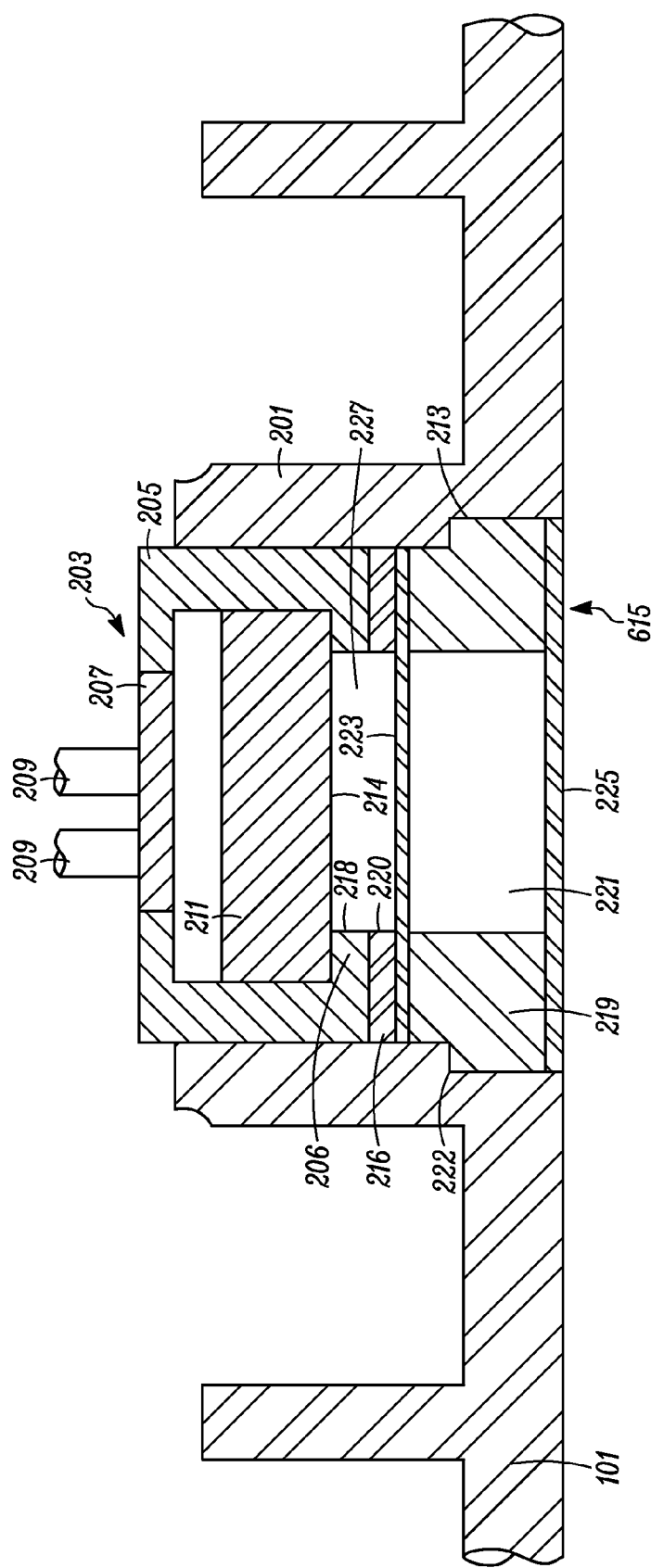
FIG. 6 is a transverse cross-section on a plane defined by the line 2-2 in FIG. 1 of an arrangement embodying the invention of a microphone and an alternative wind filter device incorporated in the radio communication unit of FIG. 1.

FIG. 6 shows a transverse cross-section through the casing 101 of the unit 100 with an alternative wind filter device 615 embodying the invention incorporated in the radio communication unit 100 in place of the filter device 215. The wind filter device 615 illustrates modifications which may be made to the wind filter device 215. The wind filter device 615 is the same as the wind filter device 215 of FIG. 2 except for the following differences. Firstly, the diameter of the inner curved edge 218 of the annular portion 206 of the filter device 615 is substantially the same as the diameter of the inner curved edge 220 of the spacer ring 216 and of the aperture 221. The exposed face 214 of the active part 211 of the microphone 203 thereby has a surface area which is substantially the same as the cross-sectional area (perpendicular to the plane of FIG. 6) bounded by the inner curved edge 220 of the spacer ring 216 and of the aperture 221. The step in the side wall of the chamber 227 of the filter device 215 is thereby not present in the filter device 615. Secondly, a matching step 222 is formed in an inner wall of the holder 201 and in an outer curved surface of the substrate 219 in the filter device 615. The step 222 facilitates correct location and fitting of the filter device 615 inside the holder 201.

The embodiments of the invention which have been described above using the filter devices 215, 415 and 615 provide a satisfactory solution to the problem of noise caused by wind in a microphone, especially a microphone of a hand portable radio communication unit. Each of the filter devices 215, 415 and 615 beneficially provides a compact, efficient wind filter when incorporated in the casing of such a communication unit in the manner which has been described above.

In the foregoing specification, specific embodiments of the present invention have been described. However, one of ordinary skill in the art appreciates that various modifications and changes can be made without departing from the scope of the present invention as set forth in the claims below. Accordingly, the specification and drawings are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The invention claimed is:

1. A hand portable radio communication unit including an arrangement of a wind filter device and a microphone fitted behind the wind filter device for use with a microphone, the wind filter device including a substrate having an aperture extending through the substrate, attached to a first face of the substrate a first layer having a first perforated region over the aperture and, attached to a second face of the substrate, a second layer having a second perforated region over the aperture, the hand portable radio communication unit including a casing having a hole in which the wind filter device is fitted to plug the hole.

2. A wind filter device according to claim 1 wherein the first perforated region and the second perforated region cover the aperture.

3. A wind filter device according to claim 1 including a spacer ring mounted against the substrate adapted to provide an enclosed chamber between the first layer including the first perforated region and a microphone.

4. A wind filter device according to claim 3 wherein the spacer ring is adapted to provide together with an annular portion of a casing of the microphone an enclosed chamber between the first layer and an active part of the microphone having a depth of between 0.5t and 1.5t, where t is a thickness of the substrate.

5. A wind filter device according to claim 1 wherein the substrate is made of an insulating material which comprises a plastics or resin based material having a thickness t related to a diameter d of the aperture by a ratio t/d, where the ratio t/d is in the range of from 0.1 to 1.0.

6. A wind filter device according to claim 1 wherein each of the first and second layers is made of a water repellent, insulating material comprising plastics or resin based material bonded to the substrate so that the perforated regions are over the aperture.

7. A wind filter device according to claim 1 wherein each of the first and second layers has a thickness which is in the range of from 0.025t to 0.075t, where t is the thickness of the substrate.

8. A wind filter device according to claim 1 wherein the perforated region of each of the first and second layers includes holes having a diameter which is in the range of from $0.005d_2$ to $0.08d_2$, where $d_2$ is the diameter of the perforated region.

9. A wind filter device according to claim 8 wherein the perforated region of each of the first and second layers includes holes having a diameter of from 0.05 mm to 0.1 mm.

10. A wind filter device according to claim 8 wherein the perforated region of each of the first and second layers has a diameter $d_2$ of 4 mm.

11. A wind filter device according to claim 8 wherein each of the first and second perforated regions includes a number of holes which is between 100 and 400.

12. A wind filter device according to claim 1 including, in front of the second perforated region of the second layer, a further layer having holes through the layer.

13. A wind filter device according to claim 12 wherein the further layer is a flexible layer of woven material including holes having a diameter of between 0.01 mm and 0.05 mm.

14. A hand portable radio communication unit according to claim 1, wherein the wind filter device has a front surface which is flush with a front surface of the casing.

* * * * *